(12) United States Patent
Zhang et al.

(10) Patent No.: US 10,277,102 B2
(45) Date of Patent: Apr. 30, 2019

(54) VIBRATION MOTOR

(71) Applicants: Tao Zhang, Shenzhen (CN); Hongfu Xu, Shenzhen (CN); Jinquan Huang, Shenzhen (CN); Yan Shao, Shenzhen (CN)

(72) Inventors: Tao Zhang, Shenzhen (CN); Hongfu Xu, Shenzhen (CN); Jinquan Huang, Shenzhen (CN); Yan Shao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 236 days.

(21) Appl. No.: 15/403,486

(22) Filed: Jan. 11, 2017

(65) Prior Publication Data

US 2018/0026506 A1 Jan. 25, 2018

(30) Foreign Application Priority Data

Jul. 20, 2016 (CN) .......................... 2016 1 0574534

(51) Int. Cl.
*H02K 41/02* (2006.01)
*H02K 33/00* (2006.01)
*H02K 33/16* (2006.01)

(52) U.S. Cl.
CPC ............. *H02K 33/00* (2013.01); *H02K 33/16* (2013.01); *H02K 41/02* (2013.01)

(58) Field of Classification Search
None
See application file for complete search history.

(56) References Cited

U.S. PATENT DOCUMENTS

| | | | | |
|---|---|---|---|---|
| 2013/0076178 A1* | 3/2013 | Kuroda | ................... | H02K 33/00 310/81 |
| 2013/0221767 A1* | 8/2013 | Akanuma | .............. | H02K 33/02 310/15 |
| 2016/0254736 A1* | 9/2016 | Jin | ......................... | H02K 33/16 310/25 |
| 2017/0173633 A1* | 6/2017 | Umehara | .............. | G01M 7/027 |

* cited by examiner

*Primary Examiner* — Quyen P Leung
*Assistant Examiner* — Minki Chang
(74) *Attorney, Agent, or Firm* — Na Xu; IPro, PLLC

(57) ABSTRACT

A vibration motor is disclosed. The vibration motor includes a housing; a fixed component accommodated in the housing; a vibrating component comprising a counterweight and a pole plate; and an elastic connecting piece for suspending the vibrating component in the housing. One of the fixed component and the vibrating component includes coils, and the other includes a magnet component. The pole plate includes a pole plate body part adhered to the counterweight and a fixation part positioned on two sides of the pole plate body, further, the fixation part is at least partially inserted into the counterweight.

10 Claims, 4 Drawing Sheets

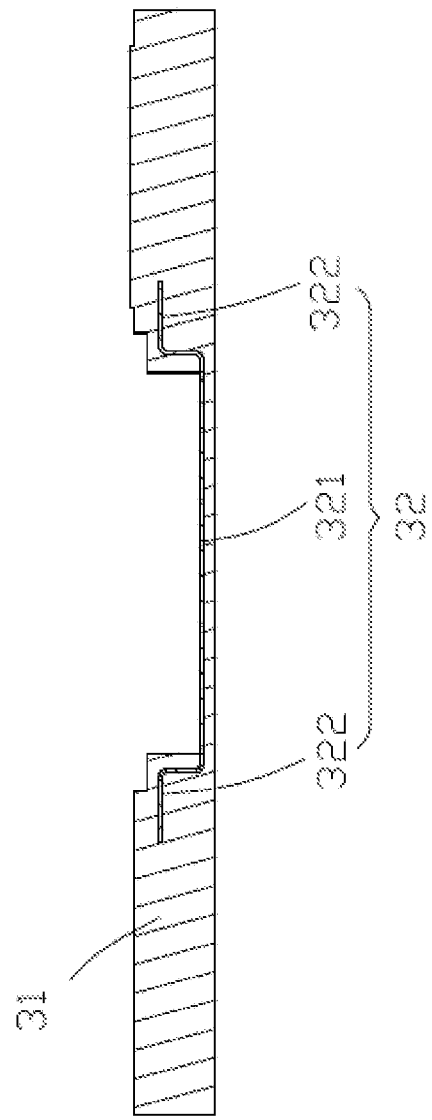

VIBRATION MOTOR

FIELD OF THE INVENTION

The invention is related to the technology of vibrators, and especially relates to a vibration motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

A related vibration motor comprises a vibrating component, wherein the vibrating component usually comprises a counterweight and a pole plate. During fabrication, the pole is connected with the counterweight usually by using laser welding after acquiring the pole plate and the counterweight; and the manual operation and a welding device are required in this connecting method, with low efficiency and high cost. Further, the counterweight may have low utility rate of space due to the problems, such as out-of-tolerance of planeness of the pole plate, space avoiding of the welding slag at the place of welding spot.

Therefore, it is necessary to provide an improved vibration motor to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 7 is a cross-sectional view taken along line A-A in FIG. 6.

DETAILED DESCRIPTION OF THE EXEMPLARY EMBODIMENT

Figure 1:
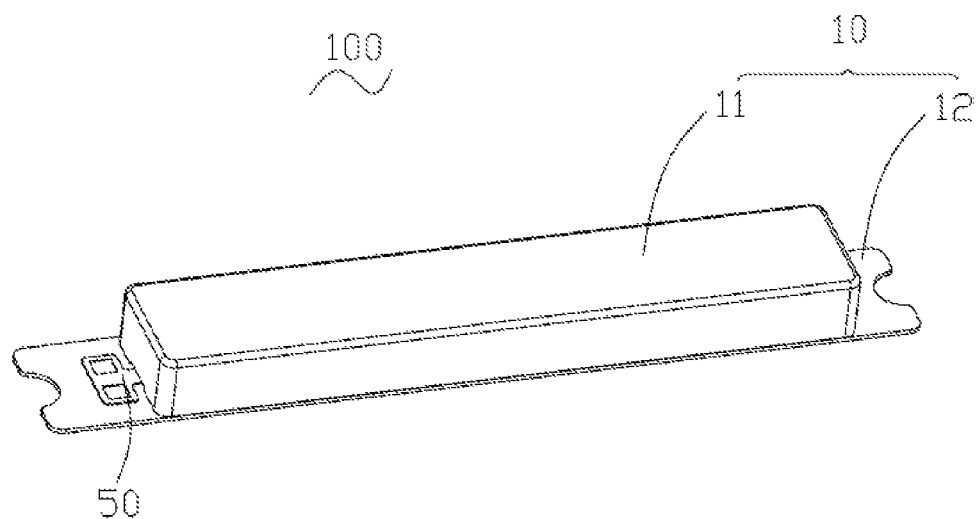
FIG. 1 is an isometric view of a vibration motor in accordance with an embodiment of the present disclosure.

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

A vibration motor 100 in accordance with an exemplary embodiment of the present disclosure, comprises a housing 10 having an accommodating space, a fixed component 20, a vibrating component 30 and an elastic connecting piece 40 accommodated in the housing 10. The housing 10 comprises a housing body 11 and a cover plate 12 covering the housing body 11 for forming the accommodating space. The fixed component 20 is fixed on the cover plate 12. The vibrating component 30 is suspended in the accommodating space by the elastic connecting piece 40 for implementing reciprocating vibration along a direction vertical to a length direction (refer to the direction Y in FIGS. 2-3) of the cover plate 12.

Figure 2:
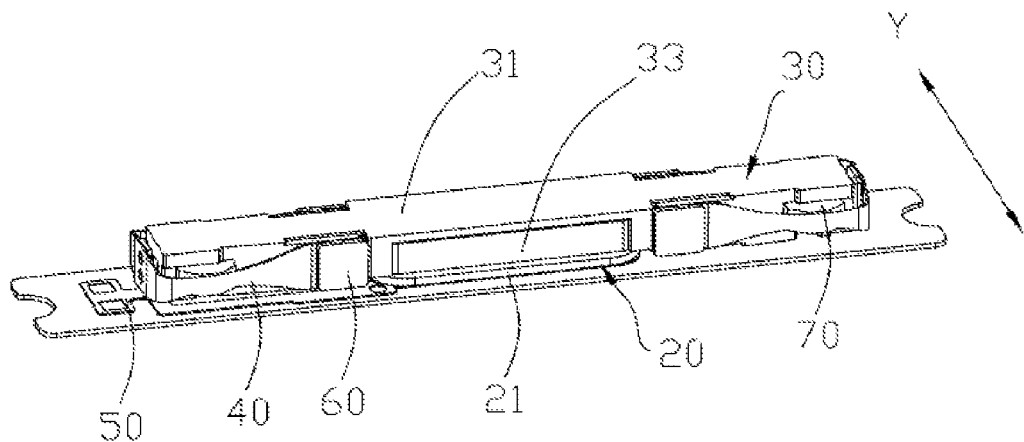
FIG. 2 is an isometric view of the vibration motor in FIG. 1, wherein a housing thereof has been removed.
Figure 3:
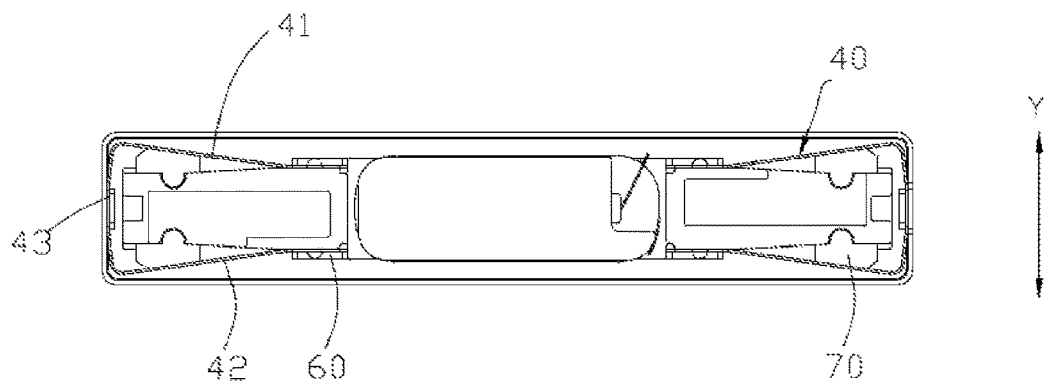
FIG. 3 is top view of the vibration motor in FIG. 1, wherein a cover plate thereof has been removed.

Referring to FIGS. 2-3, the fixed component 20 comprises a plurality of coils 21 fixed on the cover plate 12 and connecting with an external circuit by a circuit board 50.

Figure 4:
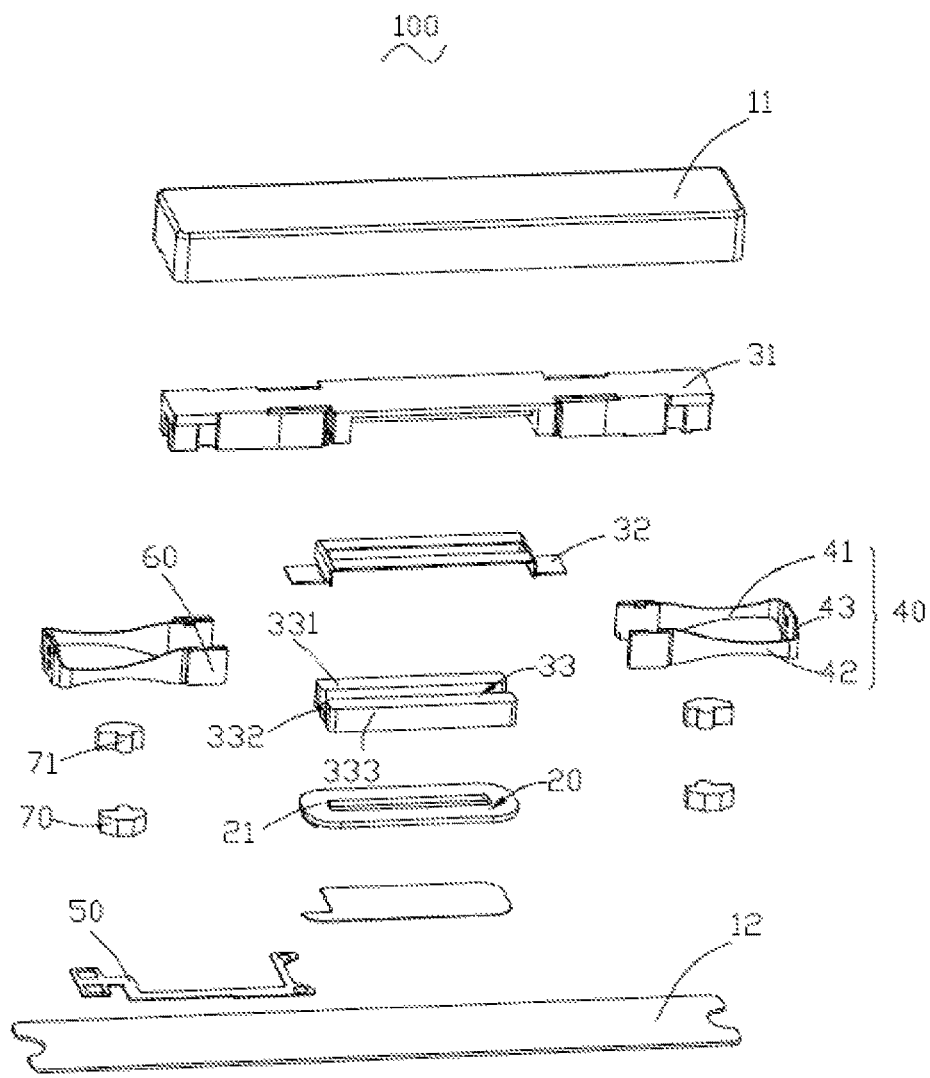
FIG. 4 is an exploded view of the vibration motor in FIG. 1.

Referring to FIG. 4, the vibrating component 30 comprises a counterweight 31, a pole plate 32 and a magnet component 33. In this embodiment, the counterweight 31 is integrally formed with the pole plate 32 preferably, and more preferably integral forming on the pole plate 32 by means of injection molding. Moreover, a groove 314 is formed on an end surface of the counterweight 31 facing the cover plate 12. And the magnet component 33 is disposed in the groove 314.

Figure 5:
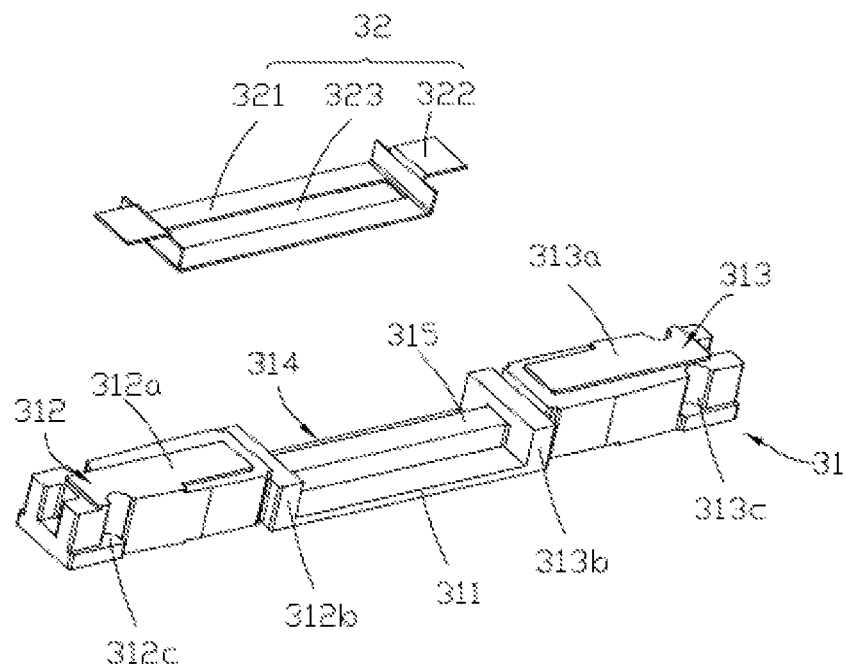
FIG. 5 is an exploded view of a counterweight and a pole plate of the vibration motor.

Referring to FIGS. 4-5, the counterweight 31 comprises a counterweight body part 311, a first side part 312 and a second side part 313 which are arranged on two sides of the counterweight body part 311 respectively. The groove 314 is formed by the counterweight body part 311, the first side part 312 and the second side part 313 jointly. The counterweight main body part 311 is connected with the first side part 312 and the second side part 313 far from the cover plate 12. The first side part 312 and the second side part 313 are connected to the elastic connecting piece 40 in order to suspend the vibrating component 30 in the accommodating space. The magnet component 33 is arranged in the groove 314.

Figure 6:
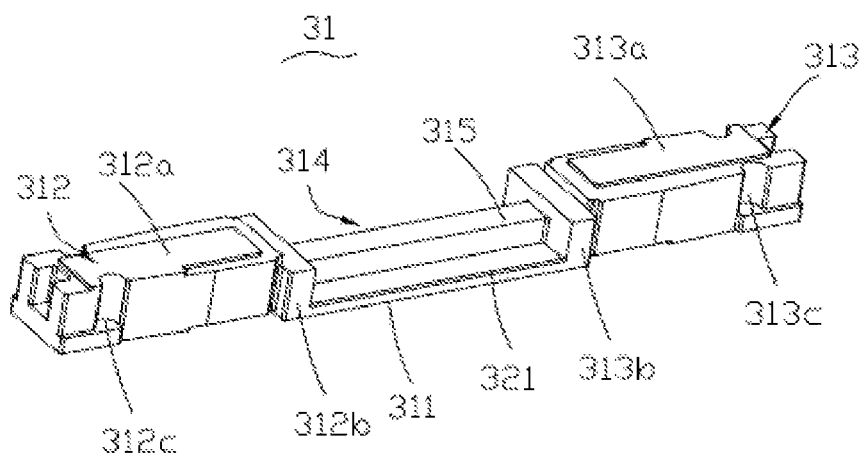
FIG. 6 is an assembled view of the counterweight and the pole plate in FIG. 5.

Referring FIGS. 5-6, the first side part 312 comprises a first holding part 312a and a first limiting part 312b connected with the first holding part 312a. The two sides of the first holding part 312a are connected to the elastic connecting piece 40, and the end of the elastic connecting piece 40 abuts against the first limiting part 312b.

Similarly, the second side part 313 comprises a second holding part 313a and a second limiting part 313b connected with the second holding part 313a. The two sides of the second holding part 313a are held by the elastic connecting piece 40, and the end of the elastic connecting piece 40 abuts against the second limiting part 313b.

The counterweight body part 311 is connected between the first limiting part 312b and the second limiting part 313b.

The counterweight body part is also provided with a reinforcing rib 315 preferably; the reinforcing rib 315 is positioned in the groove 314, for reinforcing the integral rigidity of the counterweight 31 and improving the properties of the products while increasing the weight of the counterweight 31. Specifically the reinforcing rib 315 is arranged on an end surface of the counterweight body part 311 facing the cover plate 12 and is vertical to the counterweight body part 311 generally in the embodiment shown in FIGS. 5-6; and two ends of the reinforcing rib 315 are connected with the first limiting part 312b and the second limiting part 313b. The extending length of the reinforcing rib 315 in the direction vertical to the counterweight body part 311 is less than the ones of the first limiting part 312b and the second limiting part 313b. Therefore, the groove 314 can be divided into three accommodating grooves (not numbered) by the reinforcing rib 315, in order to facilitate matching with three magnets of the magnet component 33 correspondingly.

As shown in FIGS. 5 and 7, the pole plate 32 comprises a pole plate body part 321 and fixation parts 322 which are arranged on two sides of the pole plate body part 321, wherein the pole plate body part 321 is adhered to the surface of the counterweight body part 311 facing the cover plate 12 generally (specifically arranged on the surface having the reinforcing rib 315 in the embodiment). The fixation parts 322 arranged on two sides of the pole plate body part 321 are inserted into the first side part 312 and the second side part 313 on two sides of the counterweight body part 311, respectively; therefore, the pole plate 32 can be fixed by using the fixation parts 322 inserted into the counterweight 31. Moreover, the pole plate main body 321 is also provided with an avoiding hole 323 matching with the reinforcing rib 315 in order to facilitate extension of the reinforcing rib 315 through the avoiding hole 323 to pass through the pole plate body part 312.

During processing, the pole plate 32 shall be prepared first; then the pole plate 32, for example, shall be placed in a die in order to form the counterweight 31 on the pole plate 32 by means of injection molding; therefore, the counterweight 31 and the pole plate 32 can be formed integrally. After forming, the fixation parts 322 of the pole plate 32 is inserted into the first side part 312 or the second side part 313 of the counterweight 31 as mentioned previously; while the pole plate body part 321 shall be adhered to the counterweight body part 311.

The subsequent procedure of welding the pole plate and the counterweight can be canceled because the counterweight 31 and the pole plate 32 are formed integrally; thus, the production efficiency can be improved and the production cost can be reduced effectively, even the out-of-tolerance of planeness of the pole plate as a result of welding can be solved and reservation of avoiding space for the welding slag at the place of the welding spot on the counterweight can be avoided. Therefore, the utility rate of space of the counterweight and the product performance can be improved, and the mass of the counterweight can be increased.

The example in which the counterweight and the reinforcing rib are available is given above; however, this reinforcing rib can be not arranged in accordance with other embodiments of the invention. At this time, the avoiding hole 323 allowing the reinforcing rib to pass through is also not required by the pole plate 32 correspondingly.

As further shown in FIG. 4, the magnet component 33 comprises a first magnet 331, a second magnet 332 and a third magnet 333 which are arranged in parallel along the vibrating direction Y (vertical to the length direction of the cover plate) in this embodiment, wherein the first magnet 331 and the third magnet 333 are fixed on the pole plate body part 321 and arranged on two sides of the reinforcing rib 315; while the second magnet 332 is fixed on the reinforcing rib 315. In this embodiment, the direction of magnetic pole of the first magnet 331 is opposite to the one of the third magnet 333, while the direction of the magnetic pole of the second magnet 332 is vertical to that of the first magnet 331 preferably; therefore, the vibration quantity of the vibration motor can be improved effectively. Moreover, the directions of the magnetic pole of the first magnet 331 and the third magnet 333 are vertical to coils preferably, while the direction of the magnetic pole of the second magnet 332 is parallel with the coils 21.

Further, the counterweight 31 is the solid structure in the above-mentioned embodiment, and the magnet component 33 is placed in the groove 314; however, the counterweight body part of the counterweight 31 can also be provided with the accommodation hole (not marked) according to the other embodiments of the invention, for accommodating the magnet component. At this time, the pole plate body part 321 of the pole plate is also adhered to the counterweight body part 311 of the counterweight 31 identically, while the fixation parts 322 of the pole plate are inserted into the first side part 312 and the second side part 313 respectively. Therefore, the counterweight 31 and the pole plate 32 can be formed and connected integrally by means of injection molding.

As further shown in FIGS. 3-4, the elastic connecting piece 40 is presented as a U-shaped piece generally in this embodiment in order to hold two side parts (the first side part 312 and the second side part 313) of the counterweight 31 respectively, wherein the elastic connecting piece 40 comprises a first connecting part 41 and a second connecting part 42 which are connected with the counterweight 31 generally, as well as a middle connecting part 43 connecting the first connecting part 41 and the second connecting part 42 and connecting with the housing 11. The first connecting part 41 and the second connecting part 42 are held on two opposite sides on the counterweight 31 parallel with the length direction of the counterweight 31, respectively.

The vibration motor 100 also comprises at least a block 60 which is arranged on the first connecting part 41 and/or the second connecting part 42 and/or the middle connecting part 43 preferably; therefore, the connecting strength between the first connecting part 41 and the second connecting part 42 and the counterweight 31, and/or between the middle connecting part 43 and the housing 11.

As further shown in FIGS. 2-4, a damping piece 70 is also arranged between the elastic connecting piece 40 and the counterweight 31 in this embodiment, wherein the damping piece 70 shall be prepared from the materials including but are not limited to foam, fiber, rubber, etc. The damping piece 70 and the counterweight 31 are complementary matching structure in this embodiment; specifically a first slot 312c and a second slot 313c are arranged on the first side part 312 and the second side part 313 of the counterweight 31 correspondingly in this embodiment. The damping piece 70 is provided with a projecting part 71; therefore the damping piece 70 can be fixed on the counterweight 31. The first slot 312c and the second slot 313c are arranged on the first holding part 312a and the second holding part 313a, respectively. Of course, the projecting part can also be arranged on the counterweight according to other embodiments of the invention, and the slot can be arranged on the damping piece. Moreover, the damping piece can also be arranged between the elastic connecting piece 40 and the housing 11 according to other embodiments of the invention.

The fixed component 20 comprises coils and a circuit board in the above-mentioned embodiment; while the vibrating component comprises the magnet. However, the roles of the coils 21 and the magnet 32 can be exchanged, for example, the fixed component 20 can comprise the magnet in other embodiments, and the magnet is fixed on the cover plate 12; while the vibrating component 30 comprises coils correspondingly at this time, and the coils can be suspended in the accommodating space. Therefore, each of the components which will not be displaced with respect to the housing 10 in the vibration motor 100 of the invention can be taken one part of the fixed component 20; while each of the components which reciprocate in the accommodating space in presence of electro-magnetic induction force between the coils and the magnet can be taken as one part of the vibrating component 30. Moreover, the composition of the fixed component 20 and the vibrating component 30 shall not be defined specifically in the invention.

The counterweight 31 and the pole plate 32 are formed integrally in the vibration motor 100 of the invention, therefore the subsequent procedure of welding the pole plate and the counterweight can be canceled; thus, the production efficiency can be improved and the production cost can be reduced effectively, even the out-of-tolerance of planeness of the pole plate as a result of welding can be solved and reservation of avoiding space for the welding slag at the place of the welding spot on the counterweight can be avoided. Therefore, the utility rate of space of the counterweight and the product performance can be improved, and the mass of the counterweight can be increased.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
   a housing;
   a fixed component accommodated in the housing;
   a vibrating component comprising a counterweight and a pole plate;
   an elastic connecting piece for suspending the vibrating component in the housing;
   one of the fixed component and the vibrating component comprising coils, and the other comprising a magnet component; wherein
   the pole plate comprises a pole plate body part adhered to the counterweight and a fixation part positioned on two sides of the pole plate body, further, the fixation part is at least partially inserted into the counterweight,
   the housing comprises a housing body and a cover plate covering the housing body; the counterweight comprises a counterweight body part, a first side part and a second side part connected with two sides of the counterweight body part, the counterweight body part includes a reinforcing rib formed on a surface thereof facing the cover plate, and correspondingly, the pole plate body part includes an avoiding hole matching with the reinforcing rib.

2. The vibration motor as described in claim 1, wherein the pole plate body part is adhered to the counterweight body part; and the fixation part is inserted into the first side part and the second side part, respectively.

3. The vibration motor as described in claim 2, wherein a groove for placing the magnet component is formed by the counterweight body part, the first side part and the second side part; the first side part comprises a first limiting part and a first holding part for connecting with the elastic connecting piece; the second side part comprises a second limiting part and a second holding part for connecting with the elastic connecting piece; and the counterweight body part is connected with the first limiting part and the second limiting part, respectively.

4. The vibration motor as described in claim 3, wherein the magnet component comprises a first magnet, a second magnet and a third magnet arranged in parallel along a direction vertical to a length direction of the housing; the magnetic pole direction of the first magnet is opposite to that of the third magnet and vertical to the coils; and the magnetic pole direction of the second magnet is vertical to that of the first magnet and parallel with the coils.

5. The vibration motor as described in claim 2 further comprising a damping piece fixed on the counterweight and complementary with the counterweight.

6. The vibration motor as described in claim 5, wherein the damping piece is provided with a projecting part, and the first side part and the second side part of the counterweight include a first slot and second slot corresponding to the projecting part.

7. The vibration motor as described in claim 2, wherein the counterweight body part is provided with an accommodating hole for accommodating the magnet component.

8. The vibration motor as described in claim 1, wherein the reinforcing rib is connected between the first side part and the second side part, and an extending length of the reinforcing rib in the direction vertical to the counterweight body part is less than the lengths of the first limiting part of the first side part and the second limiting part of the second side part; the first magnet and the third magnet are fixed on the pole plate body part and arranged on two sides of the reinforcing rib; and the second magnet is fixed on the reinforcing rib.

9. The vibration motor as described in claim 1, wherein the elastic connecting piece comprises a first connecting part, a second connecting part which connect with the counterweight, and a middle connecting part which connects the first connecting part and the second connecting part with the housing.

10. The vibration motor as described in claim 9 further comprising at least a block arranged on the first holding part and/or the second holding part and/or the middle connecting part.

\* \* \* \* \*